(12) United States Patent  
Boegge et al.

(10) Patent No.: US 6,334,649 B1
(45) Date of Patent: Jan. 1, 2002

(54) HOLDING DEVICE FOR RELEASABLE FASTENING OF A CHILD SEAT TO A VEHICLE SEAT

(75) Inventors: Herbert Boegge, Wiernsheim; Alfons Mäsing, Mühlacker-Enzberg, both of (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/421,350

(22) Filed: Oct. 18, 1999

(30) Foreign Application Priority Data

Oct. 17, 1998 (DE) .............................................. 198 47 956

(51) Int. Cl.⁷ ...................................................... A47C 1/08
(52) U.S. Cl. ........................................ 297/250.1; 297/468
(58) Field of Search .................................. 297/250.1, 253, 297/468, 483, 484; 24/714.6, 715, 715.2

(56) References Cited

U.S. PATENT DOCUMENTS

| 2,868,309 | A | * | 1/1959 | Burgess ..................... 297/468 X |
| 3,369,842 | A | * | 2/1968 | Adams et al. ................. 297/483 |
| 4,005,904 | A | * | 2/1977 | Weman et al. ................ 297/483 |
| 4,243,266 | A | * | 1/1981 | Anderso .................... 297/468 X |
| 4,318,552 | A | * | 3/1982 | Seifert et al. ............. 297/468 X |
| 4,582,340 | A | * | 4/1986 | Fohl ......................... 297/483 X |
| 5,466,044 | A | * | 11/1995 | Barley et al. ........... 297/250.1 X |
| 5,941,601 | A | * | 8/1999 | Scott et al. ............. 297/250.1 X |

FOREIGN PATENT DOCUMENTS

| DE | 197 23 345 C1 | 7/1998 |
| EP | 0 560 184 A1 | 9/1993 |
| EP | 0 619 202 A1 | 10/1994 |
| EP | 0 693 393 A1 | 1/1996 |
| EP | 0 694 436 A1 | 1/1996 |
| EP | 0 703 113 A2 | 3/1996 |
| EP | 0 714 806 A2 | 6/1996 |
| EP | 0 694 436 B1 | 4/1998 |

* cited by examiner

Primary Examiner—Peter M. Cuomo
Assistant Examiner—Stephen Vu
(74) Attorney, Agent, or Firm—Crowell & Moring, LLP

(57) ABSTRACT

In a holding device for releasable fastening of a child seat to a vehicle seat, at least one holding element is secured to the vehicle seat by a screw fastening. The holding element has a holding leg which projects, extends crosswise, and is aligned approximately horizontally, to which leg the child seat can be fastened. The holding element is provided with a simple design and can be easily installed by forming each holding element from an annular holding eye, with a fastening leg of the holding eye aligned approximately parallel to the holding leg being securable, from the front of the vehicle seat and by only one screw connection, to the vehicle seat.

3 Claims, 9 Drawing Sheets

US 6,334,649 B1

HOLDING DEVICE FOR RELEASABLE FASTENING OF A CHILD SEAT TO A VEHICLE SEAT

This application claims the priority of German application 198 47 956.5, filed Oct. 17, 1998, the disclosure of which is expressly incorporated by reference herein.

BACKGROUND AND SUMMARY OF THE INVENTION

The present invention relates to a holding device for releasably fastening a child seat to a vehicle seat, with at least one holding element being held in place by a screw fastening to the vehicle seat. The holding element has a holding leg that projects forward, runs transversely, and is aligned approximately horizontally, on which the child seat can be fastened.

A motor vehicle with at least one vehicle seat known from EP 0 694 436 B1 has holding devices for a child seat that can be fastened thereon. Two holding elements, arranged spaced apart in the transverse direction, are provided to hold the child seat to the seat back.

Each of the holding elements is formed by a holding loop, approximately U-shaped as viewed from above, with two lateral legs of the holding loop being passed through sleeves on sides of the seat. The lateral legs have threaded sections at their freely projecting ends, onto which sections nuts are tightened from the rear of the seat back. This arrangement is relatively cumbersome, since two screw fasteners are required to secure each holding element. The projecting screw fasteners at the rear of the seat back also pose an increased risk of injury to rear-seat passengers.

One goal of the invention is to simplify a holding element for securing a child seat to a vehicle seat and the associated screw fastening, and to make it incapable of causing injury.

This goal is achieved according to the invention by having each holding element formed by an annular holding eye, with a fastening leg aligned approximately parallel to the retaining leg of the holding eye being fastenable from the front of vehicle seat by only one screw connection on the vehicle seat.

Principal advantages achieved by the invention include creating a simple economical holding device by making each retaining element an annular holding eye, mounting from the front, and using only one screw fastener per holding eye. By locating an expanded supporting section on the holding eye, which abuts a spacing washer resting on the vehicle seat, tilt-free support is provided for the holding eye. The holding eye according to the invention can be manufactured simply and economically and can be installed and removed easily. With the holding eye removed, a covering cap is placed in the recess on the vehicle seat.

A threaded pin formed on the holding eye may be provided as the screw fastening, with the pin being screwable into a threaded receptacle on the seat. The threaded receptacle is formed by a Limbach nut, a weld nut, or the like, and is sealed fluid and gas tight. In another embodiment, the supporting section on the holding eye has a through bore through which a fastening bolt can be guided to secure the holding eye. The mounting bolt has a head portion that abuts the holding eye, with an external threaded portion of the mounting bolt being screwable into an internal thread of the threaded receptacle.

In addition, a weld screw can be fastened to the vehicle seat with a threaded shaft which projects through the spacing washer and the supporting section on the holding eye. A nut is screwed onto the projecting threaded portion.

The angular offset between the central axis of the screw fastening and the central axis of the annular holding eye means that the holding eye can be mounted in two different positions. A single type of holding eye is therefore usable in various types of vehicles (for example the convertible and coupe versions of a vehicle, with different positions of the mounting points for the child seat).

BRIEF DESCRIPTION OF THE DRAWINGS

Various embodiments of the invention are shown in the drawings and described in greater detail below.

FIGS. 8a–8c are views of a second embodiment of the holding eye with an opening in the vicinity of the supporting section to allow a mounting bolt to pass through.

DESCRIPTION OF THE PREFERRED EMBODIMENTS

Figure 1:
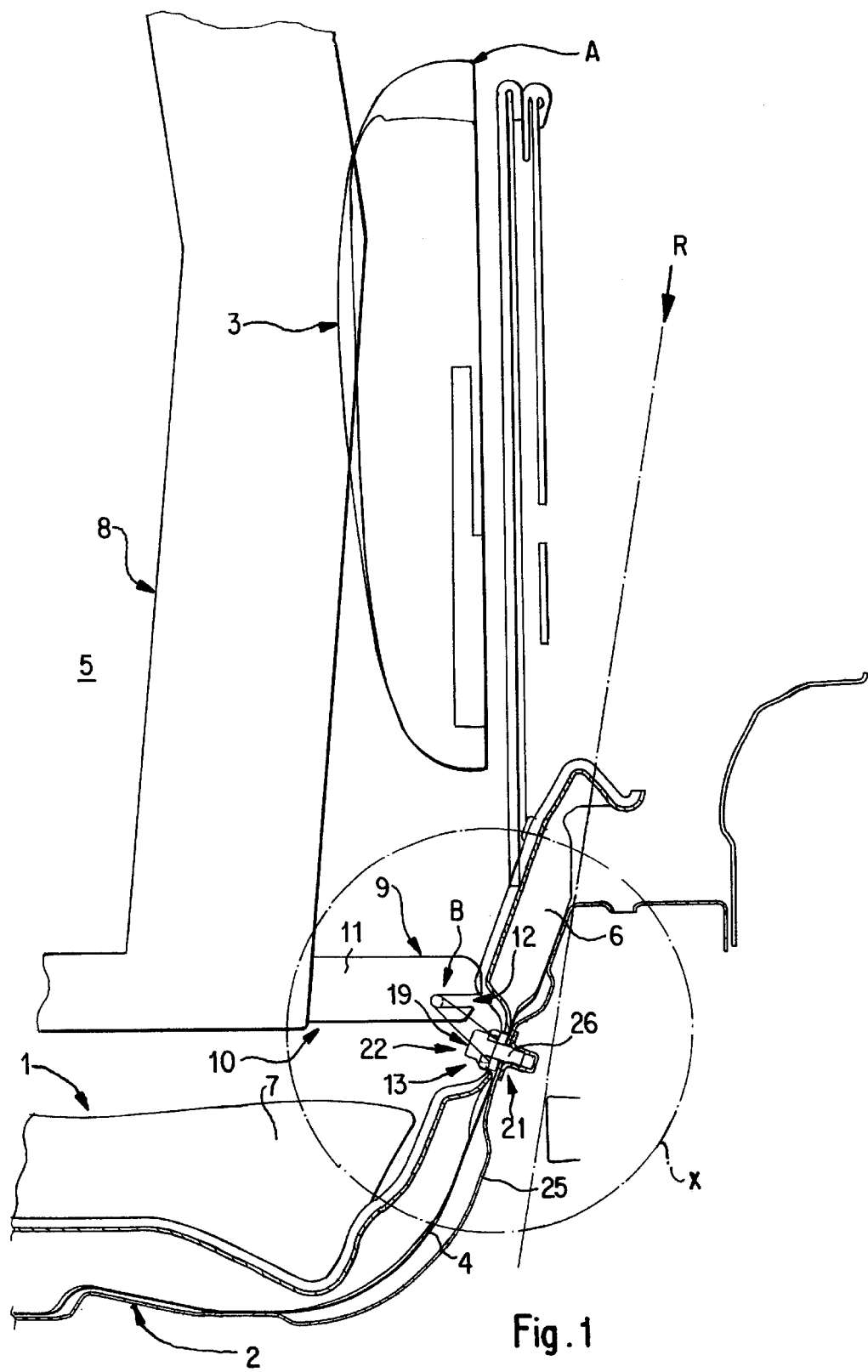
FIG. 1 is a side view of a vehicle seat with a child seat in place, shown partially in section, in a convertible version of a vehicle.
Figure 2:
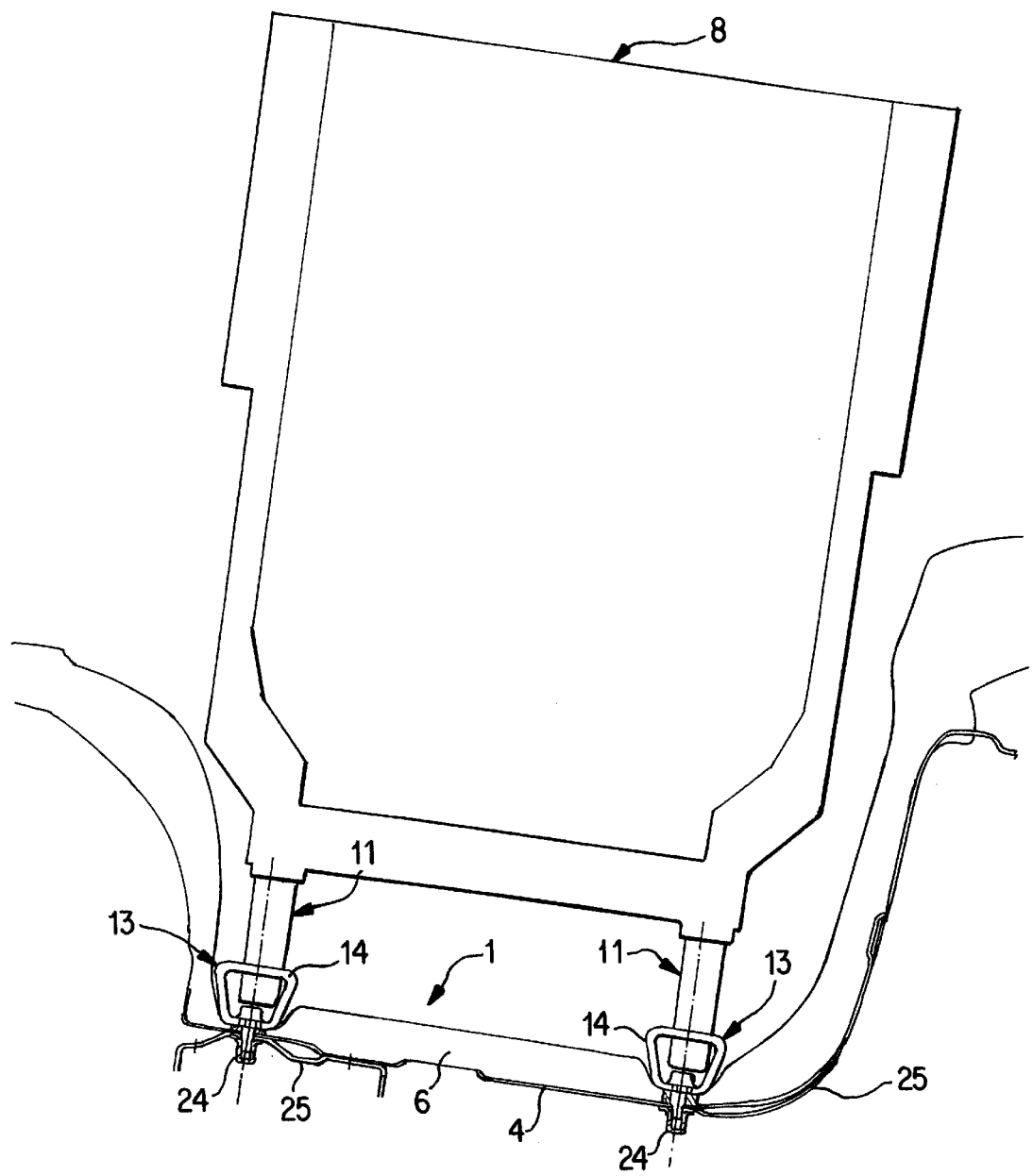
FIG. 2 is a view in the direction of arrow R in FIG. 1.
Figure 3:
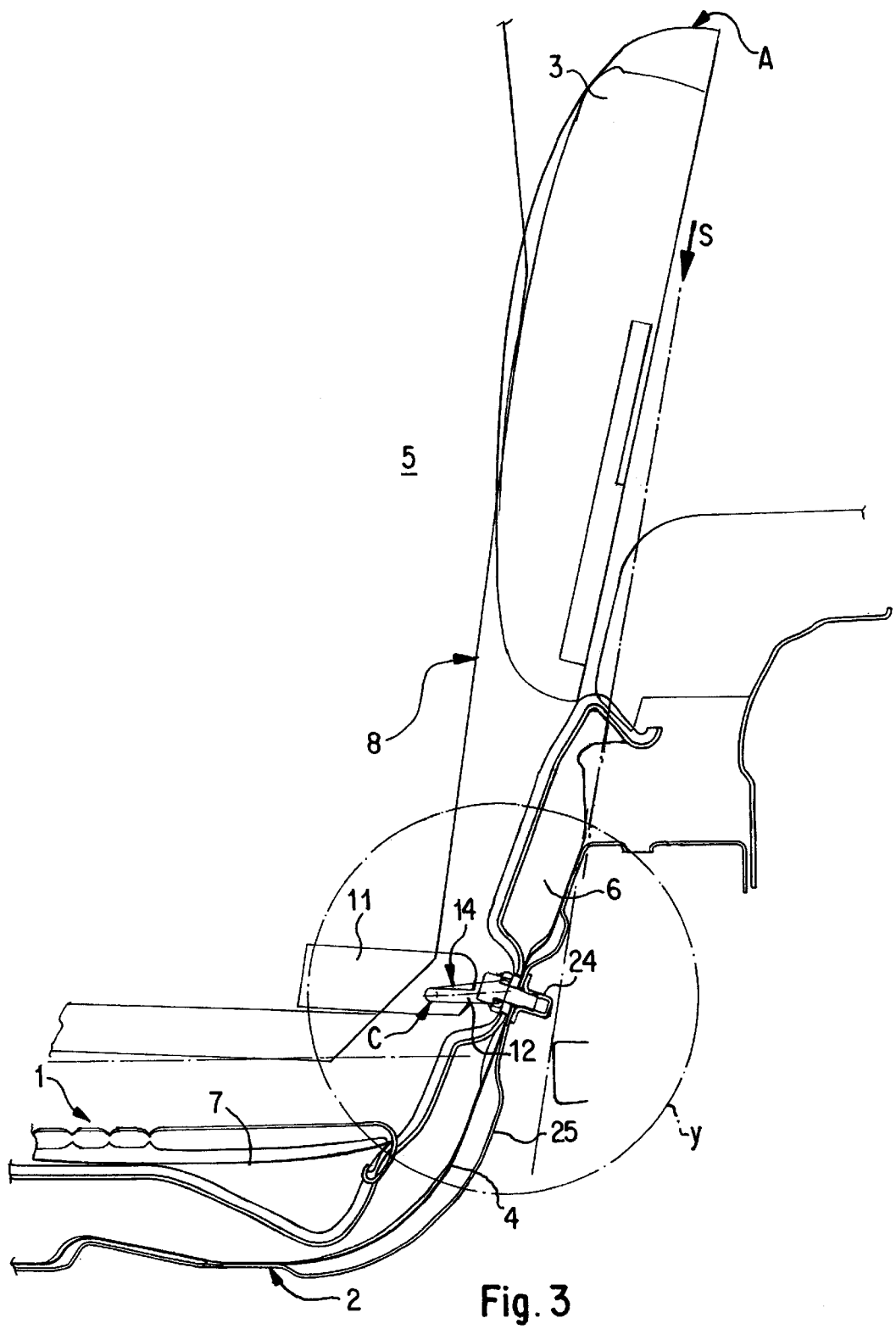
FIG. 3 is a side view corresponding to FIG. 1 of a coupe version of a vehicle.
Figure 4:
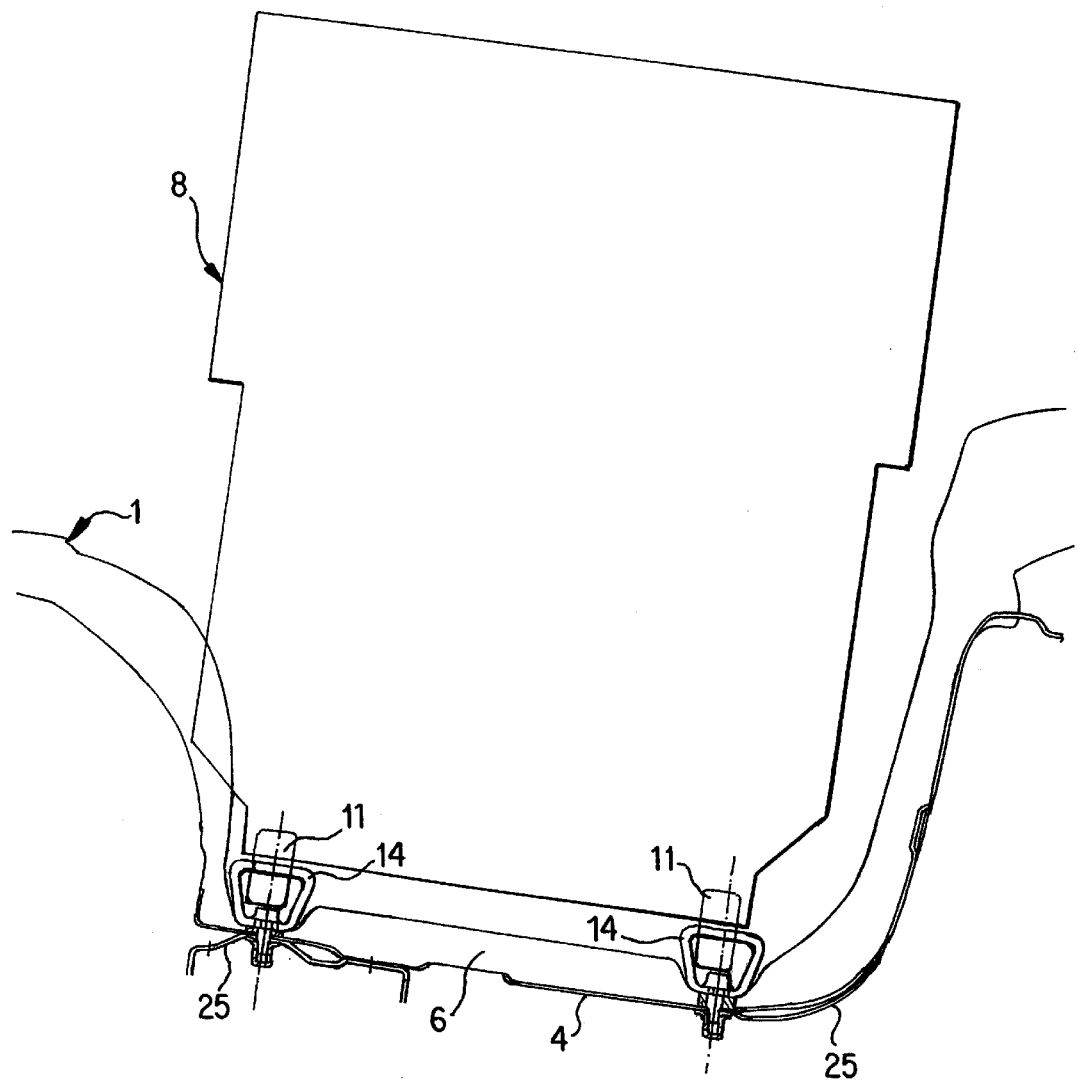
FIG. 4 is a view looking in the direction of arrow S in FIG. 3.

FIG. 1 shows a partial area of a vehicle seat 1, composed of a seat part 2 and a seat back 3. This can be a front seat or a rear seat of a vehicle.

In the embodiment shown in this figure, the vehicle seat 1 is formed by a rear seat arrangement with two seats arranged side by side and with each seat part 2 having a seat well 4 fixed to the body. The seat well has a foam-backed carpet 6 and a mounted seat cushion 7 facing a passenger compartment 5. The seat back 3 is pivotably mounted above the seat well 4 and can be folded around a horizontally aligned transverse rotational axis forward and down from an upright operating position into a storage position, not shown in greater detail.

A child seat 8 may be placed on vehicle seat 1, with the child seat 8 being connectable releasably with vehicle seat 1 by at least one holding device 9. The child seat 8 is made in conventional fashion as a one-piece shell seat and has a front panel, not shown in great detail, which can be secured by a lap belt on the child seat 8.

The child seat 8, in a rear lower area 10, has two mounting tabs that project and are spaced apart from one another as viewed in the transverse direction of the vehicle. At the free end of each lengthwise fastening tab 11, an insertion opening 12 and a pivotable latching pawl are provided.

With the child seat 8 mounted, each latching pawl fits around a portion of a retaining member 13 fastened to the vehicle seat. The latching pawl can be displaced from a locking position into a release position in which the child seat 8 can be removed from the vehicle seat 1.

According to the invention, each retaining member 13 is formed by an annular holding eye 14. Each holding eye 14 has a retaining leg 15 which projects forward and is aligned approximately horizontally and transversely. This leg, as viewed in cross section, has a circular profile and a diameter of 6 mm. The rod-shaped retaining leg 15 that runs transversely has a transverse distance of at least 25 mm.

In addition, each annular holding eye 14 comprises a shorter fastening leg 16 that runs approximately parallel to the retaining leg 15. The fastening leg 16 has an expanding supporting section 17 in a central area of its transverse part.

The supporting section 17 rests on a cylinder spacing washer 18 that rests on the vehicle seat 1. Each annular holding eye 14 can be secured to the vehicle seat 1 from the front by only one screw connection 19.

Lateral connecting sections 20, extending diagonally, connect the retaining legs 15 located in the front on both sides with the fastening legs 16 of the holding eye 14. The connecting sections 20 of the holding eye 14 have an elliptical cross section, with the height of the connecting sections 20 increasing in the direction of the fastening legs 16. The holding eye 14, preferably formed by a forged or cast part, as seen in a top view, has an almost trapezoidal contour. The transitional areas from the retaining leg 15 and the fastening leg 16 to the connecting sections 20 that run diagonally are rounded.

Supporting section 17 of the fastening leg 16, in the embodiment presently described, has a cylindrical outer shape, with the outside diameter of the supporting section 17 approximately matching the outside diameter of spacing washer 18.

The fastening points 21 for the holding eye 14 are provided in a portion of the seat well 4 on the body that projects upward, slightly above the fitted seat cushion 7.

In the vicinity of holding eyes 14, the foam-backed carpet 6 is provided with local recess 22. With holding eyes 14 not installed, covering caps which are not shown in greater detail can be inserted into these recesses 22. This can be accomplished by clipping or the like.

Figure 7A:
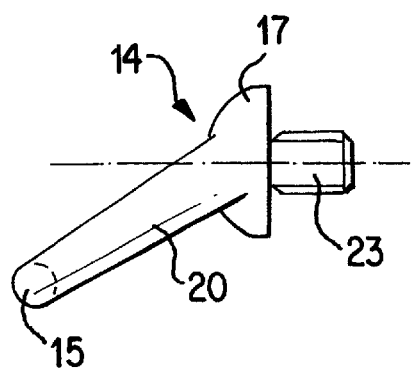
FIGS. 7a–7c show a first embodiment of the holding eye with a threaded pin.
Figure 7B:
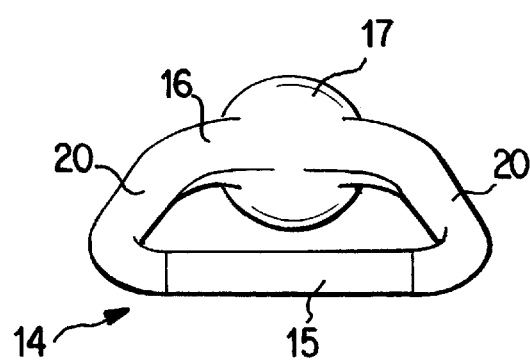
Figure 7C:
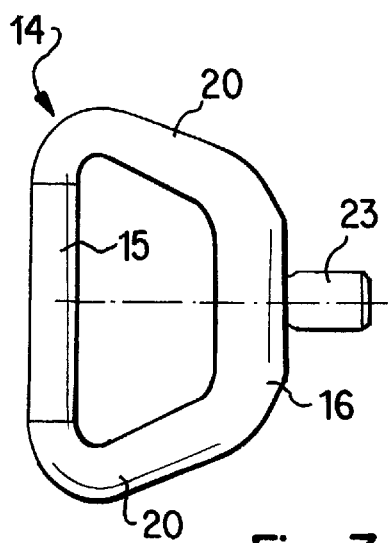
Figure 8A:
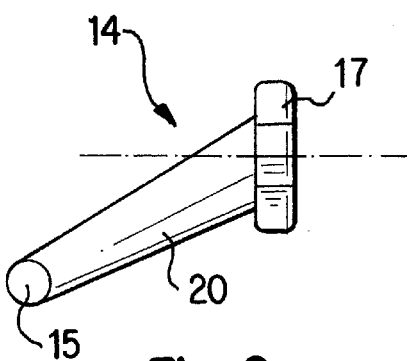
Figure 8B:
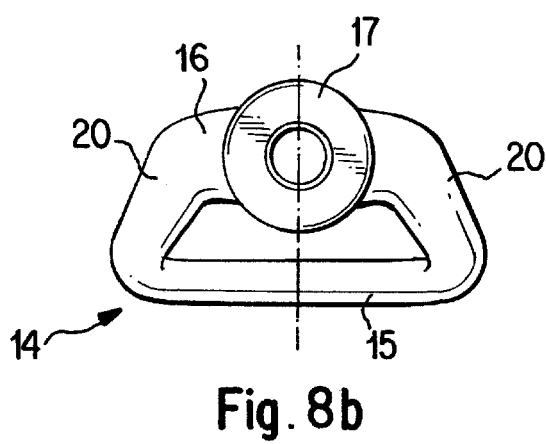
Figure 8C:
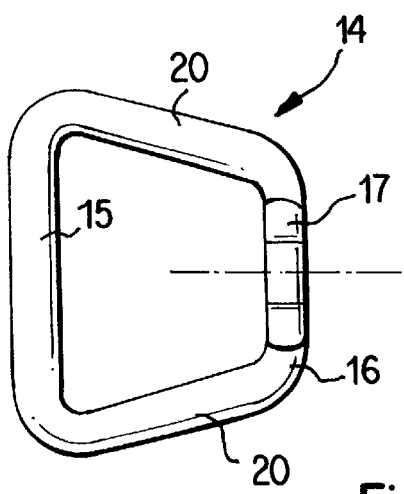

According to a first embodiment (FIGS. 7a–7c), the screw fastening 19 comprises a projecting threaded pin 23 formed on the supporting surface of the fastening leg 16, with the external thread of the threaded pin 23 being screwable into a fixed threaded receptacle 24 of the vehicle seat 1.

The threaded receptacle 24 has an internal thread and is formed by a closed Limbach nut 25, a weld nut, or the like.

The threaded receptacle 24 is fastened on an external reinforcement 25 of the seat well 4 by welding or the like.

Reinforcement 25 is formed by a fitted shaped corner plate or by a belt buckle reinforcement.

According to a second embodiment (FIGS. 5, 6 and 8a–8c), the screw fastening 19 comprises a mounting bolt 26 that abuts, with a head section 27, on the side of the supporting section 17 that faces away from the spacing washer 18, with a threaded section of the mounting bolt 26 being guided through openings in the supporting section 17, the spacing washer 18, and the seat well 4, and having its free end screwed into the fixed threaded receptacle 24 of the vehicle seat 1.

Figure 9:
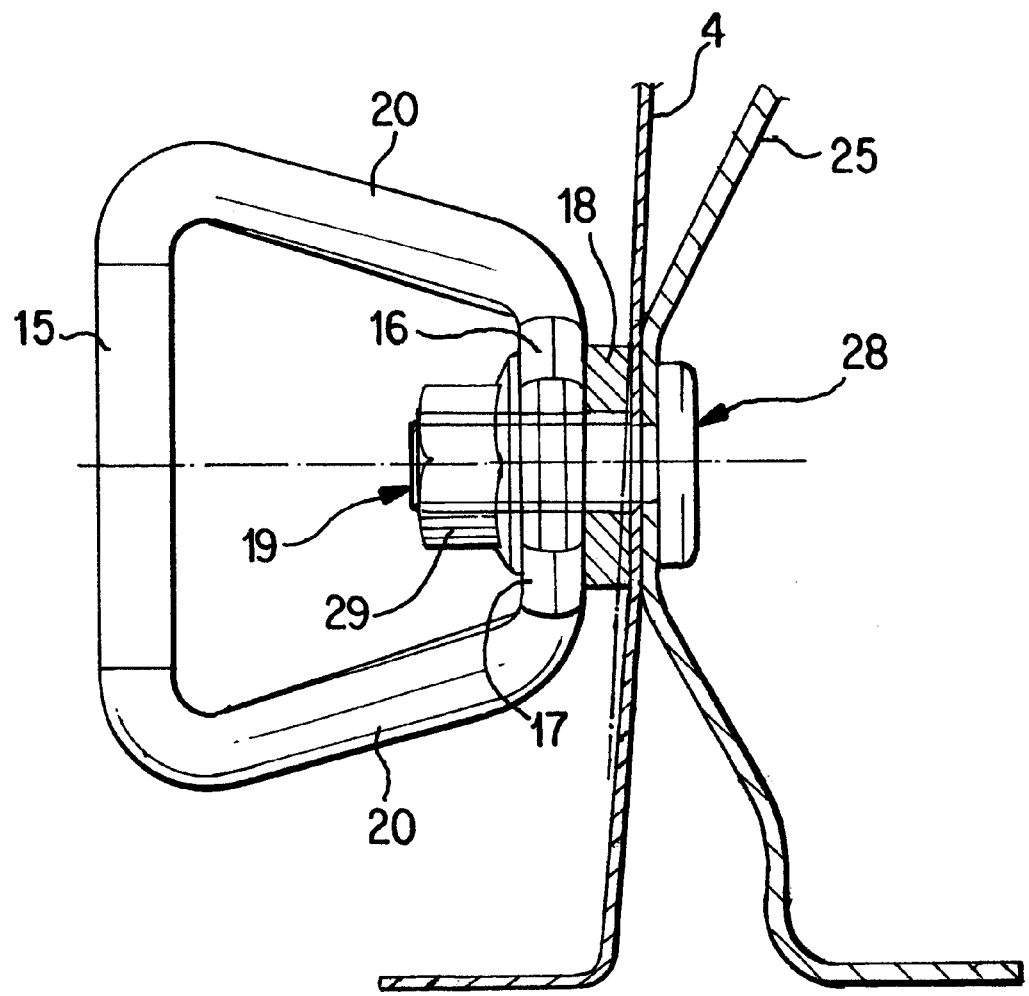
FIG. 9 is a section through a third embodiment of the bolted fastening with a weld screw bolt mounted on the vehicle seat.

According to a third embodiment (FIG. 9), the screw connection 19 comprises a weld screw bolt 28, fastened to the vehicle seat 1, with a threaded section which is guided through openings in the seat well 4, the spacing washer 18, and the supporting section 17, with a nut 29 being tightened on the projecting threaded portion, and supporting the holding eye 14 on the supporting section 17.

Holding eye 14 can be designed so that, as viewed from the side, a central axis 30 of the screw connection 19 cooperates with the central axis 31 of the annular holding eye (not shown in greater detail).

Figure 5:
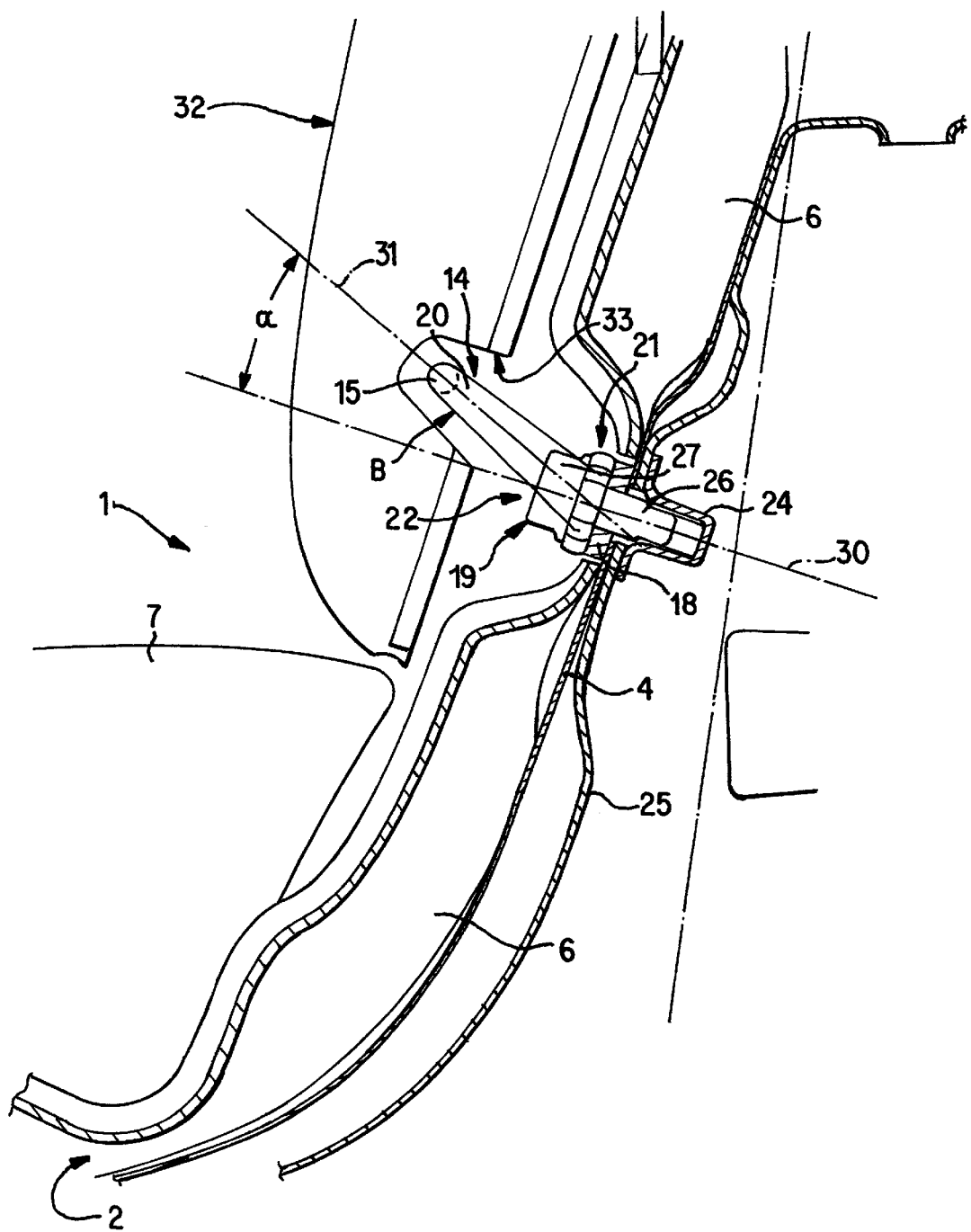
FIG. 5 is a portion X of FIG. 1 on an enlarged scale without the child seat in place.
Figure 6:
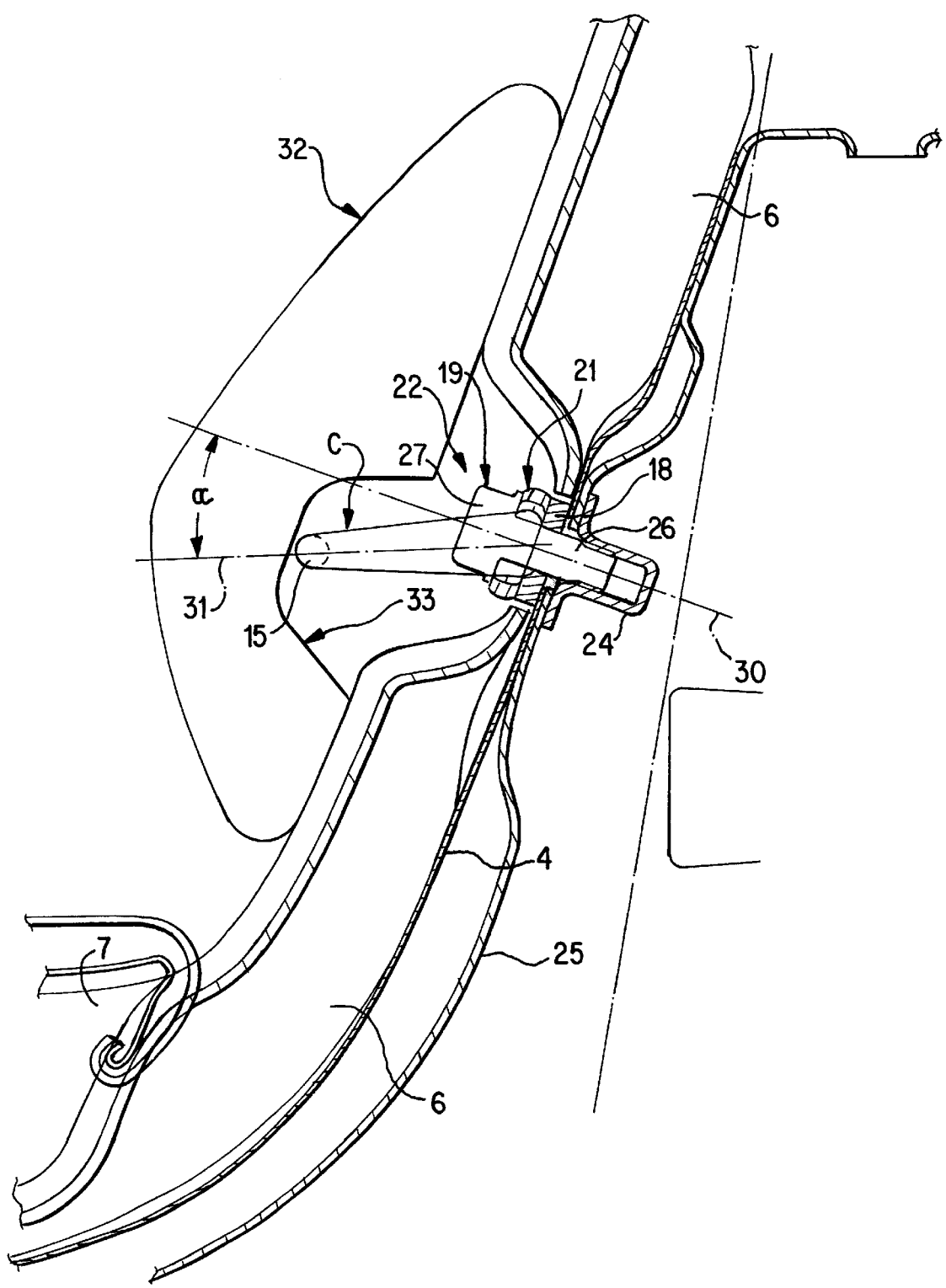
FIG. 6 is a view Y of FIG. 3 on an enlarged scale without the child seat in place.

As shown in FIGS. 5 and 6, for example, as viewed from the side, the central axis 31 of the holding eye 14 is oriented relative to the central axis 30 of the screw connection 19 at an angle a such that the holding eye 14 can be mounted in two different operating positions. In a first operating position B, in which the central axis 31 of the holding eye 14 is directed forward and upward at an angle, the holding eye 14 is installed for the convertible version of the vehicle in which the invention is used. The holding eye 14 is provided in a second operating position C, in which central axis 31 of holding eye 14 is directed diagonally forward and downward, for the coupe version of the vehicle in which the invention is used.

When the holding eye 14 is installed and the child seat 8 is not mounted on vehicle seat 1, an additional covering part 32 is mounted on the vehicle seat 1 and covers the holding eyes 14. The covering part 32 is provided locally with a recess 33.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A holding device for releasable fastening of a child seat to a vehicle seat, said device comprising:

at least one holding element, and a screw fastening for holding the at least one holding element in place to the vehicle seat, the at least one holding element having a retaining leg that projects forwardly from a fastening leg, runs transversely between a pair of lateral connecting sections, extends approximately horizontally, and on which the child seat can be fastened, wherein each said holding element is formed by an annular holding eye, which has said fastening leg aligned approximately parallel to said retaining leg of the holding eye, said holding eye being fastenable from the front of the vehicle seat by only one screw connection on the vehicle seat, and wherein, the holding eye has a central axis oriented to the retaining leg with the fastening leg at an angle relative to a central axis of the screw connection so that the holding eye can be installed in two different operating positions of the seat.

2. A holding device for releasable fastening of a child seat to a vehicle seat, said device comprising:

at least one holding element, and a screw fastening for holding the at least one holding element in place to the vehicle seat, the holding element having a retaining leg that projects forwardly from a fastening leg, transversely between a pair of lateral sections, extends approximately horizontally, and on which the child seat can be fastened, wherein each of the holding elements is formed by an annular holding eye, which has said fastening leg aligned approximately parallel to said retaining leg of the holding eye, said holding eye being fastenable from the front of the vehicle seat by only one screw connection on the vehicle seat, wherein the holding eye has a substantially trapezoidal shape, and said retaining leg is a rod-shaped retaining leg having a transverse length greater than the fastening leg, and wherein, the holding eye has a central axis oriented to the retaining leg with the fastening leg at an angle relative to a central axis of the screw connection so that the holding eye can be installed in two different operating positions of the seat.

3. A holding device for releasable fastening of a child seat to a vehicle seat, said device comprising;

at least one holding element, and a screw fastening for holding the at least one holding element in place to the vehicle seat, the holding element having a retaining leg that projects forwardly from a fastening leg, transversely between a pair of lateral connecting sections, and extends approximately horizontally, and on which the child seat can be fastened, wherein each of the holding elements is formed by an annular holding eye, which has said fastening leg aligned approximately parallel to said retaining leg of the holding eye, said holding eye being fastenable from the front of the vehicle seat by only one screw connection on the vehicle seat, wherein the holding eye has a substantially trapezoidal shape, and said retaining leg is a rod-shaped retaining leg having a transverse length greater than the fastening leg, wherein the fastening leg has a transverse part, and further comprising a supporting section formed as an enlarged central area of the transverse part of the fastening leg, said supporting section abutting a spacing washer resting on the vehicle seat, and wherein, the holding eye has a central axis oriented to the retaining leg with the fastening leg at an angle relative to a central axis of the screw connection so that the holding eye can be installed in two different operating positions of the seat.

* * * * *